United States Patent [19]

Tezuka

[11] Patent Number: 4,890,175
[45] Date of Patent: Dec. 26, 1989

[54] RECORDING MEDIUM MOUNTING MEANS AND RECORDING OR REPRODUCING APPARATUS INCORPORATING SAME

[75] Inventor: Nobuo Tezuka, Kanagawa, Japan

[73] Assignee: Canon Kabushiki Kaisha, Tokyo, Japan

[21] Appl. No.: 274,670

[22] Filed: Nov. 21, 1988

Related U.S. Application Data

[63] Continuation of Ser. No. 846,594, Mar. 31, 1986, abandoned.

[30] Foreign Application Priority Data

Apr. 1, 1985 [JP] Japan .................................. 60-068740
Jul. 4, 1985 [JP] Japan .................................. 60-148110

[51] Int. Cl.⁴ ............................................. G11B 17/04
[52] U.S. Cl. ............................. 360/97.01; 360/99.06; 360/99.12; 360/86
[58] Field of Search .............. 360/97.01, 98.08, 99.01, 360/99.04–99.07, 99.12, 96.5, 133, 86

[56] References Cited

U.S. PATENT DOCUMENTS

| | | | |
|---|---|---|---|
| 4,498,161 | 2/1985 | Eisemann | 360/97 X |
| 4,694,362 | 9/1987 | Oosaka et al. | 360/97 |
| 4,703,373 | 10/1987 | Oosaka | 360/97 |
| 4,717,976 | 1/1988 | Nishmura et al. | 360/97 |

*Primary Examiner*—John H. Wolff
*Attorney, Agent, or Firm*—Robin, Blecker, Daley & Driscoll

[57] ABSTRACT

A recording or reproducing apparatus has a mounting member arranged at a recording medium receiving member. The mounting member press fits the recording medium onto the drive shaft of the apparatus as the receiving member is moved to place the recording medium in a recording or reproducing position. The apparatus is provided with a release member for releasing the mounting member when a cover member is moved to a given position in which it closes the opening in the receiving member for receiving the recording medium.

19 Claims, 11 Drawing Sheets

F I G. 1(A)
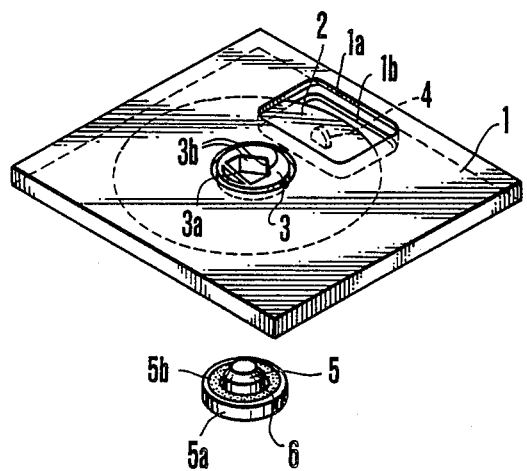

FIG. 1(B)
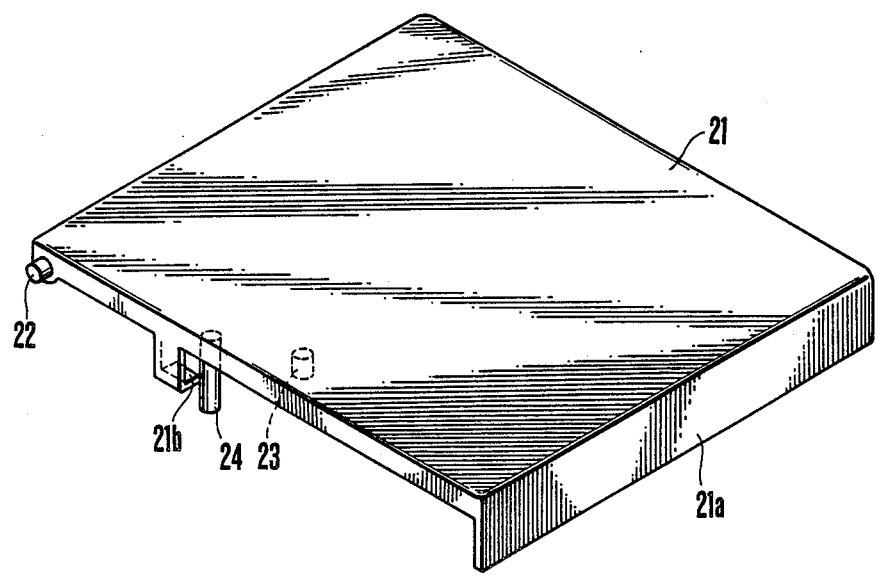
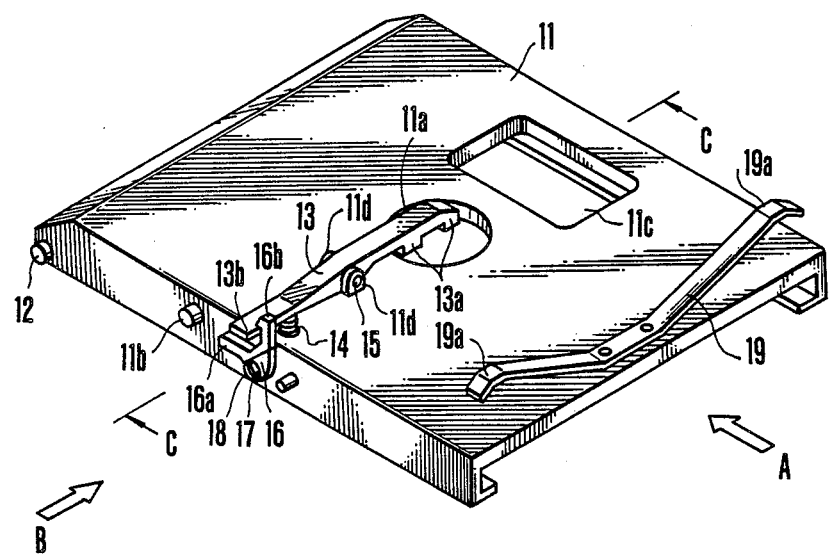

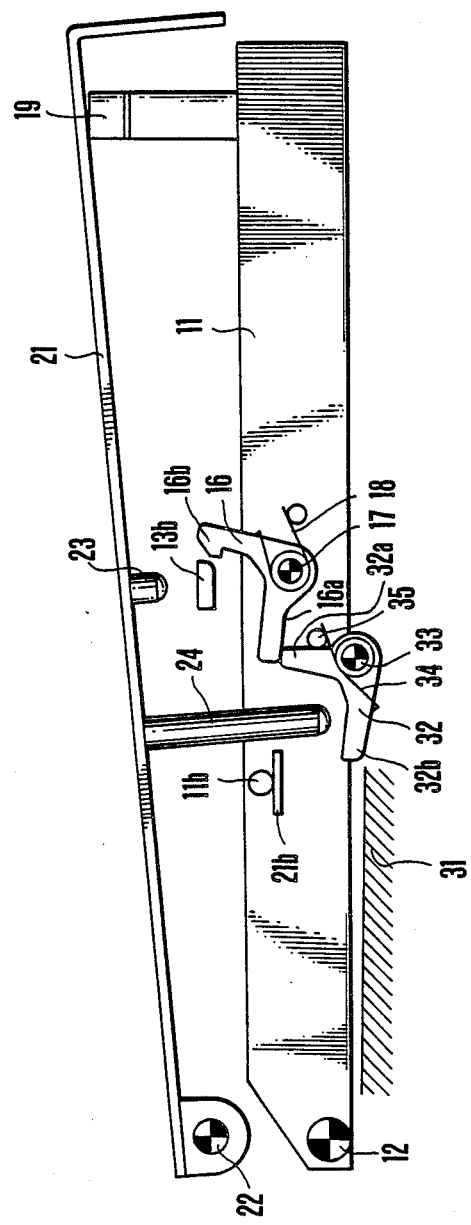

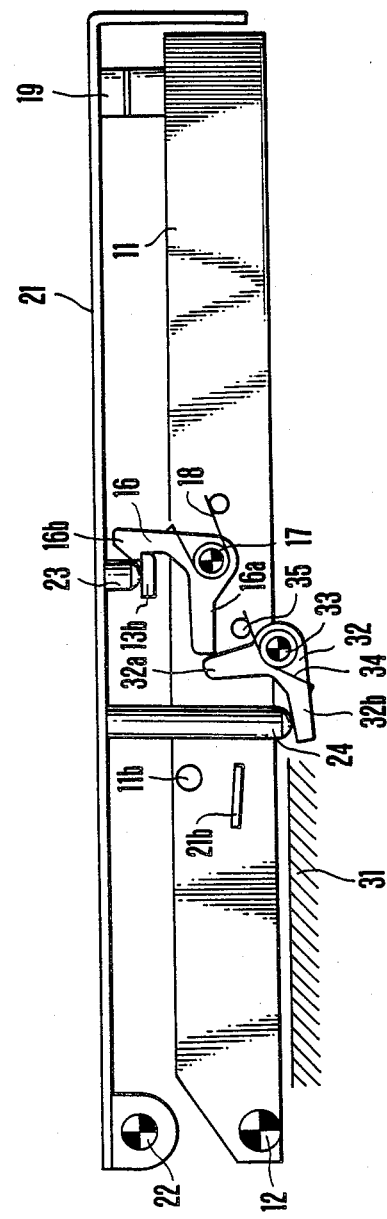

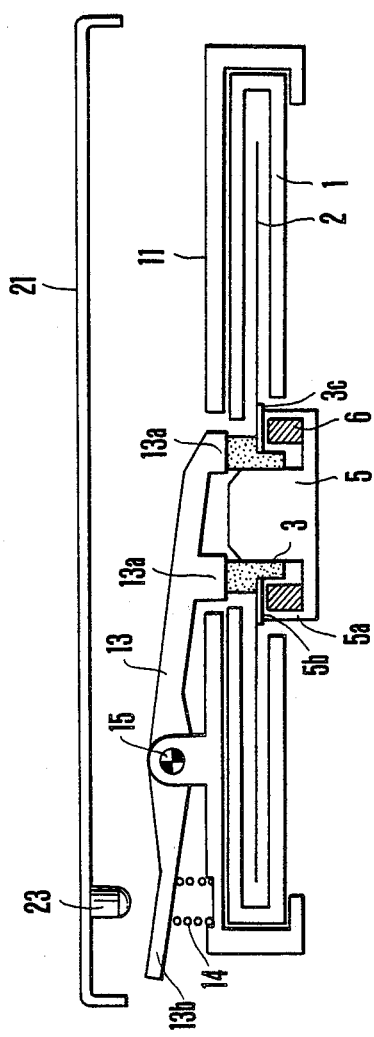
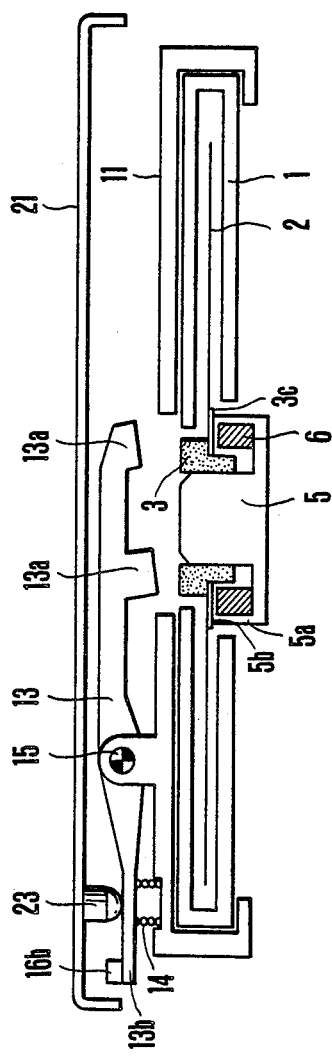

FIG.4
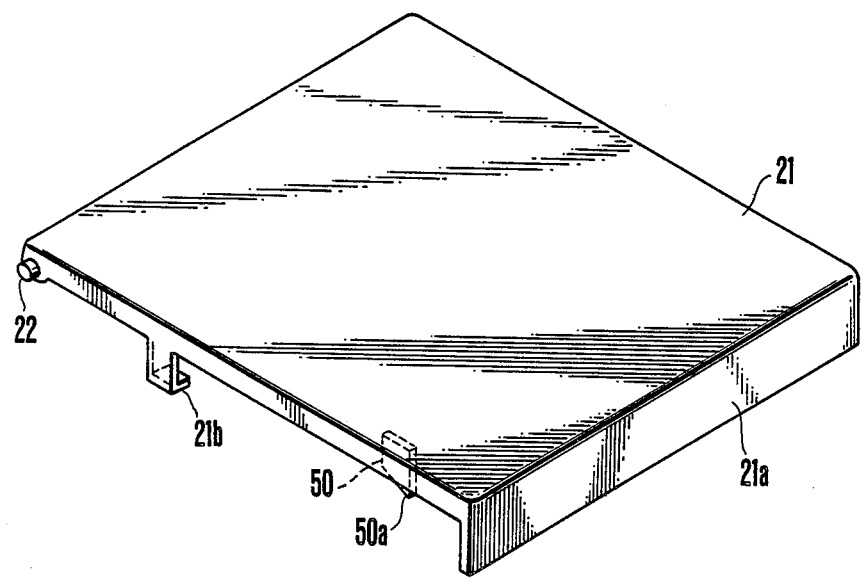
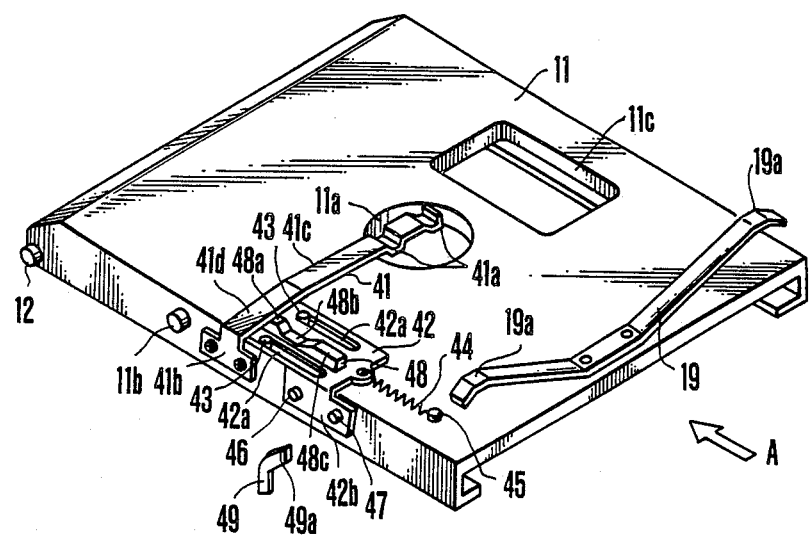

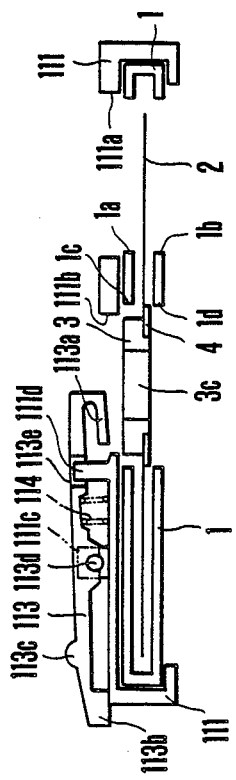
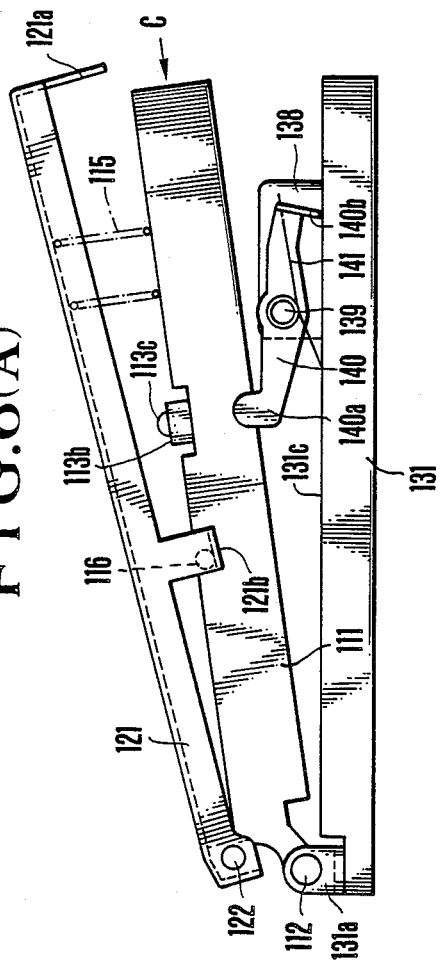
FIG.6(A)
FIG.6(B)

RECORDING MEDIUM MOUNTING MEANS AND RECORDING OR REPRODUCING APPARATUS INCORPORATING SAME

This application is a continuation of application Ser. No. 846,594, filed Mar. 31, 1986, now abandoned.

BACKGROUND OF THE INVENTION

1. Field of the Invention

This invention relates to a recording or reproducing apparatus and more particularly to a device provided in the apparatus for mounting a recording medium on a rotary driving shaft.

2. Description of the Prior Art

There are various known recording or reproducing apparatus which are arranged to record or reproduce information on or from a recording medium such as a rotary magnetic sheet. The apparatus of this kind must have the recording medium accurately and reliably mounted on a rotary driving shaft. Inadequate mounting results in the eccentricity of recording tracks relative to the axis of rotation. Then, in reproducing the signal recorded on the recording medium by a reproducing apparatus other than an apparatus used for recording, for example, the eccentric recording tracks become hardly traceable. Further, inadequate mounting causes an increase in a spacing loss between the recording medium and a recording or reproducing head. The increased spacing loss then comes to hinder adequate signal conversion to be performed between the recording medium and the head.

To avoid these inconveniences, there have been contrived various methods for lessening the eccentricity including an arrangement to press fit the recording medium on a rotary driving shaft, an arrangement to prepare the rotary driving shaft in a tapered shape, etc. The conventional mounting methods further include the provision of positioning means for setting the recording medium in a predetermined position by providing a permanent magnet on the rotary driving shaft with a magnetizable member arranged in the corresponding position on the recording medium. Then, by virtue of an attraction between the two, the recording medium can be set in the predetermined position in relation to the rotary driving shaft. In another known method, pressing means is arranged to forcefully push the middle part of the medium against the driving shaft to ensure that the medium and the shaft rotate in one unified body or in firm contact with each other during a recording or reproducing operation.

In the method of using the permanent magnet, the magnet must be sufficiently large in size for obtaining a required magnitude of attraction or must be made of an expensive rare earth material. It is another disadvantage of this method that, in the case of such a recording medium as a magnetic sheet, the information recording or reproduction might be affected by the increased attraction of the permanent magnet. Therefore, there is an increasable limit to the attraction. In the case of the method of using the pressing means for forcefully pushing the recording medium against the rotary driving shaft to have the medium rotate in one unified body with the shaft or to keep them in firm contact, the rotating precision of the medium tends to be affected and the load on a driving motor is increased by the action of the pressing means. That method is, therefore, not suitable for a recording or reproducing apparatus using a small rotary magnetic sheet or a small motor.

To solve these problems, there have been proposed some apparatuses arranged to push the mount part of a recording medium against a rotary driving shaft in a press fitting manner in mounting the medium and, after that, to cancel the press fit state. In one example of such arrangement of the prior art, a recording medium receiving member which is movable for bringing the medium in a recording or reproducing position is provided with a movable external cover member for covering the receiving member. The external cover member is arranged to bring about the above-stated press fit state when it moves and to automatically release the press fit state when it is locked to the body of the apparatus in a given position. In another example of such arrangement, the apparatus is provided with some release means that is arranged to undo the above-stated press fit state in response to completion of the covering action of the external cover member. In both cases, the press fit mounting means is arranged in association with the external cover member. Therefore, the arrangement does not ensure adequate positional precision in pressing the mount part of the recording medium. Besides, it presents a difficulty in terms of assembly precision. It also tends to become large in size because the pressing action must be performed on a recording medium in its state of being placed within the receiving member. The arrangement, therefore, tends to hinder an attempt to reduce the size of the apparatus.

SUMMARY OF THE INVENTION

It is therefore an object of this invention to provide an recording or reproducing apparatus wherein the above-stated mounting means and release means are arranged to ensure adequate positioning precision in pressing the mount part of a recording medium; to ensure accurate and reliable mounting of the medium on a rotary driving shaft; and to permit reduction in size of the mounting means itself to contribute to reduction in size of the apparatus.

It is another object of this invention to provide a recording or reproducing apparatus which is capable of ensuring adequate positioning precision in pressing the mount part of a recording medium to ensure thereby accurate and reliable mounting of the medium on a rotary driving shaft and is arranged to perform mounting and undoing or releasing operations with such a simple and compact structural arrangement that contributes to reduction in size and cost of the apparatus.

To attain the above-stated objects, a recording or reproducing apparatus arranged according to this invention as an embodiment example thereof comprises: a receiving member which is arranged to house a recording medium therein and to be movable for setting the medium in a given recording or reproducing position; an external cover member which is movable to a given position to close up the receiving member; a rotary driving shaft which is arranged to drive the recording medium set in the recording or reproducing position; mounting means which is arranged at the receiving member to press fit the mount part of the recording medium onto the rotary driving shaft; and release means which is arranged to cancel the press fit mounting state of the mounting means when the external cover member moves to the above-stated given position thereof.

With the embodiment arranged as described above, when the receiving member is moved to the above-stated given position for setting the recording medium in the recording or reproducing position, the mounting means performs the press fit mounting action to press the recording medium against the rotary driving shaft. After that, when the external cover member is moved to the above-stated given position to close up the receiving member, the press fit mounting state of the mounting means is cancelled by the release means. As a result, the recording medium alone imposes a load on the rotary driving shaft.

Further, to attain the above-stated object, a recording or reproducing apparatus which is arranged as another embodiment example of this invention comprises: a receiving member which is arranged to house a recording medium therein and to be movable for setting the medium in a given recording or reproducing position; a rotary driving shaft which is arranged to drive the recording medium set in the recording or reproducing position; mounting means which is arranged at the receiving member to press fit the mount part of the recording medium onto the rotary driving shaft; and an external cover member which is arranged to be movable to a given position to close up the receiving member and to act, at least at the given position, on the mounting means to cancel the press fit mounting state of the mounting means.

With that embodiment arranged as described above, when the receiving member is moved to the above-stated given position for setting the recording medium in the recording or reproducing position, the mounting means performs the press fit mounting action to press the recording medium against the rotary driving shaft. After that, when the external cover member is moved to the above-stated given position to close up the receiving member, the external cover member acts, at least at the given position, on the mounting means to cancel the press fit mounting state of the mounting means. As a result, the recording medium alone imposes a load on the driving shaft.

These and further objects and features of this invention will become apparent from the following detailed description of embodiments thereof taken in connection with the accompanying drawings.

BRIEF DESCRIPTION OF THE DRAWINGS

FIG. 1(A) is an oblique view showing a magnetic sheet cassette as in relation to a sheet rotating spindle of a recording or reproducing apparatus to which this invention is applicable. FIG. 1(B) is an exploded oblique view showing an embodiment of this invention and particularly the cassette mounting part thereof which is an essential part for this invention.

FIGS. 2(A), 2(B) and 2(C) are side views showing the movement of various parts according to the varied turning positions of an external cover and a cassette holder as viewed in the direction of arrow B of FIG. 1(B), FIG. 2(A) showing the external cover and the cassette holder as in the process of their turning movement, FIG. 2(B) showing the holder as in a state of having reached a predetermined recording or reproducing position where the center core of the magnetic sheet is pressed by a pressing member and FIG. 2(C) showing the external cover as in a state of having reached a predetermined closing position where the center core is released from pressure.

FIGS. 3(A) and 3(B) are side views showing the movement of various parts according to the varied turning positions of the external cover and the cassette holder as viewed in the direction of arrow C of FIG. 1(B), FIG. 3(A) showing the center core as in a state of being pressed by a pressing member and FIG. 3(B) showing the same as in a state of having been released from the pressed state.

FIG. 4 is an exploded oblique view similar to FIG. 1(B) showing another embodiment of this invention.

FIGS. 6(A) and 6(B) are a side view showing the set states of various related parts under a condition of having the external cover opened as viewed in the direction of arrow A of FIG. 5 and a sectional view taken along line B—B of FIG. 5 respectively.

DETAILED DESCRIPTION OF THE PREFERRED EMBODIMENTS

Figure 2A:
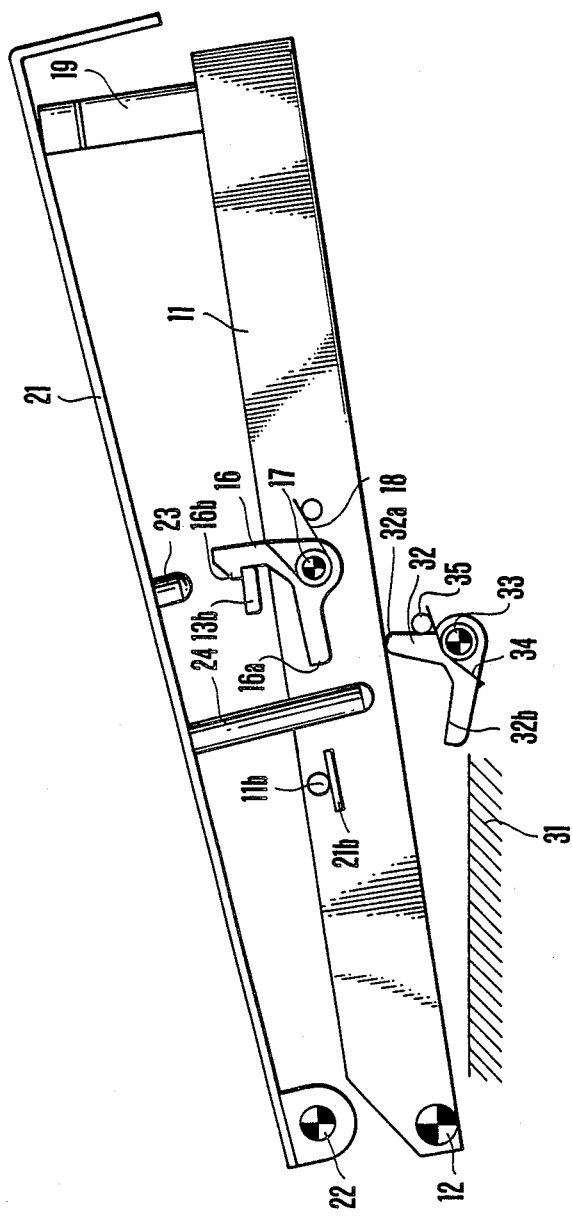

Some examples of the preferred embodiments of this invention are arranged as described below with reference to the accompanying drawings:

FIG. 1(A) shows a cassette 1 containing a recording medium. The recording medium is a rotary disc-shaped magnetic sheet 2. A center core 3 which is made of a synthetic resin or the like is secured to the middle part of the magnetic sheet 2. A magnetizable plate 3c which is shown in FIGS. 3(A) and 3(B) is secured to the center core 3. The cassette 1 is provided with upper and lower apertures 1a and 1b, which are arranged to allow a stabilizer plate, etc. to enter the cassette therethrough for the purpose of stabilizing the rotation of the sheet 2. Further, the lower aperture 1b allows a magnetic head 4 to come to abut on the sheet 2. A spindle 5 which serves as a rotary driving shaft for the sheet 2 is arranged to be rotated by a sheet rotating motor which is not shown. The spindle 5 is provided with a flange part 5a. An end face 5b of the flange part 5a is arranged to have the lower surface of the center core 3 come to abut thereon. With the lower surface of the center core 3 thus abutting on the end face 5b, the height of the magnetic sheet 2 relative to the head 4 is defined. A permanent magnet 6 is provided at the flange part 5a of the spindle 5 and is arranged to attract the above-stated magnetizable plate 3c which is arranged at the center core 3. A fitting engagement part between the center core 3 and the spindle 5 is formed in the center core 3 jointly by two slanting parts 3b and a spring part 3a. When the center core 3 is mounted on the spindle 5, the spring part 3a pushes the slanting parts 3b against the circumferential face of the spindle 5. The spindle 5 and the sheet 2 rotate together in a state of being coupled into one unified body with each other by virtue of the pressing force of the center core 3 on the spindle in conjunction with the attracting force of the permanent magnet 6. With the sheet 2 rotated in this manner, the above-stated head 4 performs signal recording or reproduction.

In the mounting method described, if the pressing force of the spring part 3a and the slanting face parts 3b of the center core 3 on the spindle 5 is excessively large, the attracting force of the permanent magnet 6 might become incapable of bring the center core 3 into contact with the end face 5b of the flange part 5a, because: The mounting operation tends to be affected by the dimentional precision and the finished states of the spindle 5 and the center core 3, temperature, etc. Such inadequate mounting engagement results in an increased spacing loss between the head 4 and the sheet 2. Then adequate signal recording or reproduction becomes no longer possible.

This invention is directed to the solution of this problem. An embodiment of this invention is arranged as shown in an oblique view in FIG. 1(B). FIG. 1(B) shows a recording or reproducing apparatus of the kind using the cassette 1 of FIG. 1(A) and particularly the essential components of the cassette mounting part of the apparatus. A cassette holder 11 serves as a cassette receiving member and is arranged to have the cassette 1 of FIG. 1(A) inserted therein in the direction of arrow A. The holder 11 is pivotally carried by a shaft 12 at a hinge part which is not shown but is provided on the body of the apparatus. Apertures 11a and 11c are formed in the cassette holder 11. The holder 11 is provided with a center core pressing member 13 which is turnable on a shaft 15 provided at a raised part 11d thereof and is urged by a spring 14 to turn clockwise. The holder 11 is further provided with an engaging member 16 which is urged by a spring 18 to turn counterclockwise on a shaft 17 provided on one side face of the holder and is thus arranged to keep the pressing member 13 in its non-operating position. The hook part 16b of the engaging member 16 is arranged to engage the tail end 13b of the pressing member 13. At the fore end of the pressing member 13, there are arranged pressing parts 13a which are arranged to push the center core 3 of the magnetic sheet 2 at points symmetrically located on the diameter of the center core 3. These pressing parts 13a are positioned above the aperture part 11a of the holder 11. A leaf spring 19 is disposed on the upper surface of the holder 11. The free end 19a of the leaf spring 19 is arranged to push an external cover 21 from below in such a way as to move the external cover 21 and the holder 11 in opposite directions, that is, to have a turning force exerted in the direction of windening the space on an angle between the holder 11 and the external cover 21.

Further, the holder 11 is provided with an aperture 11c for allowing a stabilizer plate to enter therethrough to stabilize the rotation of the magnetic sheet 2 for the head 4. The external cover 21 is arranged to close up the holder 11. The cover 21 is also pivotally carried by a shaft 22 in the same manner as the holder 11 at the hinge part of the body of the apparatus which is not shown. This external cover 21 is provided with a lock device which is not shown but is arranged between one end part 21a of the cover 21 and the apparatus body which is also not shown. A hook part 21b is arranged on one side of the external cover 21 to engage a pin 11b which is provided on the holder 11. By this engagement, the angle between the external cover 21 and the holder 11 which is being widened by the urging force of the above-stated leaf spring 19 is kept at a predetermined angle. Meanwhile, on the ceiling part of the external cover 21, there are provided first and second pressing pins 23 and 24. The first pressing pin 23 is arranged to push the tail end 13b of the center core pressing member 13 to cancel thereby the pressing action of the latter when the external cover 21 is closed. The second pressing pin 24 is arranged to push the arm part 32b of a release member 32 which will be described later herein.

FIGS. 2(A) to 2(C), 3(A) and 3(B) illustrate the operation of the embodiment which is arranged as described above. FIG. 2(A) shows the external cover 21 and the holder 11 as in a state of having been opened for inserting or taking out the cassette 1. In the illustration, a reference numeral 31 denotes a part of the apparatus body. A release member 32 is provided on the body 31 and is urged by a spring 34 to turn clockwise on a shaft 33. A stopper-and-spring peg 35 keeps the release member 32 in the illustrated position in this instance. Further, under the condition of FIG. 2(A), the engaging member 16 engages the tail end 13b of the center core pressing member 13. Therefore, the pressing parts 13a are located above and away from the aperture 11a of the holder 11 and thus do not hinder the cassette 1 from being inserted or taken out into or from the holder 11.

Assuming that the cassette 1 is thus inserted into the holder 11, the external cover 21 is closed by turning it clockwise. In this instance, the holder 11 and the external cover 21 are turned round clockwise together keeping a predetermined space (or angle) between them due to the actions of the pin 11b and the hook part 21b of the external cover 21 in conjunction with the urging force of the leaf spring 19 which is provided on the holder 11. The holder 11 then comes to a predetermined position relative to the apparatus body 31 where the cassette 1 can be set in a recording or reproducing position as shown in FIG. 2(B). One end 16a of the engaging member 16 then engages the arm part 32a of the release member 32. This causes the engaging member 16 to turn round clockwise. As a result, the hook part 16b of the engaging member 16 is disengaged from the tail end 13b of the pressing member 13. The urging force of the spring 14 comes to turn the center core pressing member 13 clockwise as shown in FIG. 3(A). The pressing parts 13a push the center core 3 with the pressing force imparted by the spring 14. The pressing force obtainable from the spring 14 is set at a value predetermined according to the condition of the fitting engagement between the center core 3 and the spindle 5. The pressing force is also preferably set at such a value that brings about no adverse effect through the spindle 5 on a spindle rotating motor which is not shown. In this manner, the magnetic sheet 2 is accurately and reliably mounted on the spindle 5 at the center core 3.

With the external cover 21 further turned round, it reaches a predetermined position to close up the holder 11 as shown in FIG. 2(C). The cover 21 is then locked to the apparatus body 31 by means for a lock device which is not shown. In that instance, the first pressing pin 23 which is provided on the external cover 21 pushes the tail end 13b of the center core pressing member 13 to enable the hook part 16b of the engaging member 16 to engage the tail end 13b and to turn the member 13 counterclockwise. This causes the pressing parts 13a to move away from the center core 3 as shown in FIG. 3(B). Meanwhile, the second pressing pin 24 of the cover 21 pushes the arm part 32b of the release member 32 to cause the latter to turn counterclockwise. Therefore, another arm part 32a of the release member 32 moves away from the arm part 16a of the engaging member 16. As a result, the urging force of the spring 18 again causes the hook part 16b of the engaging member 16 to engage the tail end 13b of the pressing member 13.

In taking out the cassette 1, when the external cover 21 and the holder 11 are opened, the embodiment of course comes back to the state of FIG. 2(A) as will be understood without any further description.

Another Embodiment:

Another embodiment of this invention is arranged as shown in FIG. 4, which corresponds to FIG. 1(B). In FIG. 4, the same reference numerals as those used in FIGS. 1 to 3 indicate the parts similar to the corresponding parts of the preceding embodiment example. In this case, a center core pressing member 41 which serves as mounting means is formed by a leaf spring. The center core pressing member 41 is provided with a pair of pressing parts 41a which are arranged at the fore end of the member 41 and a bent part 41b which is disposed at the tail end of the member 41 and is secured to one side of the holder 11. A base part 41d of the member 41 continues from the bent part 41b and continues to the pressing parts 41a via a tapered part 41c.

A slide member 42 is arranged to be slidable to the left and right as viewed on the drawing with slot parts 42a thereof engaging a pair of pins 43 which are provided on the upper surface of the holder 11. A coiled spring 44 which is disposed between the slide member 42 and a spring peg provided on the holder 11 urges the slide member 42 to slide rightward as viewed on the drawing. One part 42b of the slide member 42 is bent along one side face of the holder 11. A pair of pins 46 and 47 protrude from the bent part 42b of the slide member.

A cam 48 is mounted on the slide member 42 to effect change-over between the operating position and the non-operating position of the pressing member 41 relative to the center core 3. The cam 48 consists of a first high lift part 48a, a low lift part 48b and a second high lift part 48c. The high lift parts 48a and 48c are arranged to act on the base part 41d of the pressing member 41. In this case, the pressing parts 41a of the member 41 are arranged to be moved upward away from the aperture 11a of the holder 11 by means of these high lift parts 48a and 48c. Meanwhile, the low lift part 48b is arranged to be sufficiently low to enable the base part 41d of the pressing member 41 to come down and thus to permit the pressing parts 41a to press the center core 3 with the downward displacement of the pressing member 41 resulting from its own resilience. As shown, the first high lift part 48a comes to abut on the base part 41d of the pressing member 41 when the slide member 42 is caused to slide by the force of the spring 44 to the right end position thereof. Further, to smoothen the up and down movement of the base part 41d of the pressing member 41, tapered parts are arranged between the high lift parts 48a and 48c and the low lift part 48b.

A first tapered member 49 corresponds to the release member 32 of the preceding example of embodiment. When the holder 11 comes down to the position of FIG. 2(B), a tapered part 49a of the first tapered member 49 comes to engage the first pin 46 of the slide member 42 from the right-hand side of the pin. This engagement causes the slide member 42 via the pin 46 to slide to the left against the force of the spring 44 until it comes to a position where the low lift part 48b confront the base part 41d of the pressing member 41. The first tapered member 49 is secured to the apparatus body 31. A second tapered member 50 corresponds to the first pin 23 of the preceding embodiment example. When the external cover 21 is moved to the closing position as shown in FIG. 2(C), a tapered part 50a of the second tapered member 50 comes to engage the second pin 47 of the slide member 42 from the righthand side thereof. This engagement causes the slide member 42 via the pin 47 to slide against the force of the spring 44 to a predetermined point where the second high lift part 48c of the cam 48 comes to engage and uplift the base part 41d of the pressing member 41. The second tapered member 50 is secured to the ceiling part of the external cover 21.

With the external cover 21 and the holder 11 in an open state, the slide member 42 is in a state of having been slided to its right end position by the force of the spring 44. Therefore, the first high lift part 48a is located beneath the base part 41d of the pressing member 41 and is uplifting the base part 41d. This causes the pressing member 41 to be displaced upward against its own resilience. Under that condition, therefore, the pressing parts 41a are located above and away from the aperture part 11a of the holder 11 and the pressing member is in its non-operative position relative to the center core of the magnetic sheet.

With the cassette 1 inserted into the holder 11 under this condition, when the holder 11 is turned downward to the predetermined position as shown in FIG. 2(B), the first tapered member 49 which is secured to the apparatus body 31 causes the slide member 42 via the first pin 46 to slide to the left to the above-stated predetermined point against the force of the spring 44. As a result, the low lift part 48b of the cam 48 comes to confront the base part 41d of the pressing member 41. Accordingly, the pressing member 41 is released from its state of being restricted by the first high lift part 48a of the cam 48 and is thus brought into a lower position by its own resilience. The pressing parts 41a then come to push the center core 3 to mount it on the spindle 5 as shown in FIG. 3(A).

Following that, when the external cover 21 is turned further downward to the predetermined closing position as shown in FIG. 2(C), the second tapered member 50 which is secured to the ceiling part of the external cover 21 causes the slide member 42 via the second pin 47 thereof to slide to the left against the force of the spring 44 to the above-stated predetermined point. As a result, the second high lift part 48c of the cam 48 comes below the base part 41d of the pressing member 41. The base part 41d is then uplifted and is thus displaced upward against its own resilience. The center core 3 is then released from the pressing action of the pressing parts 41a, which are moved upward above the aperture part 11a of the holder 11.

Then, signal recording or reproduction can be performed under this condition.

In taking the cassette 1 out of the holder 11, the operation of the embodiment is performed in a manner reverse to the operation described above.

In this specific embodiment, the release means for releasing the magnetic sheet from the press fit mounting action of the mounting means 41 is formed jointly by the second high lift part 48c of the cam 48 and the second tapered member 50.

In both the embodiments described, the pressing member 13 or 41 which serve as mounting means is disposed on the holder 11 for the purpose of enhancing the precision of the press fit mounting position of the center core 3. The press fit mounting operation, therefore, can be accurately and reliably carried out. Besides, the arrangement of these embodiments permits reduction in size of related parts, so that it contributes to reduction in size of the apparatus.

Further, in the embodiment described, the leaf spring 19, the pin 11b and the hook part 21b are arranged to keep a spacing distance between the external cover 21 and the holder 11 unvarying when they are in an open state. However, to attain the same purpose, this arrangement may be replaced with some link mechanism.

The invented arrangement described in the foregoing adequately assures the positional precision in pressing the mount part of the recording medium. The medium therefore, can be accurately and reliably fitted on the rotary driving shaft. The mounting means can be compactly arranged to contribute to reduction in size of the apparatus. Therefore, the mounting means and the release means arranged in combination can be highly advantageously employed in a recording or reproducing apparatus.

Figure 5:
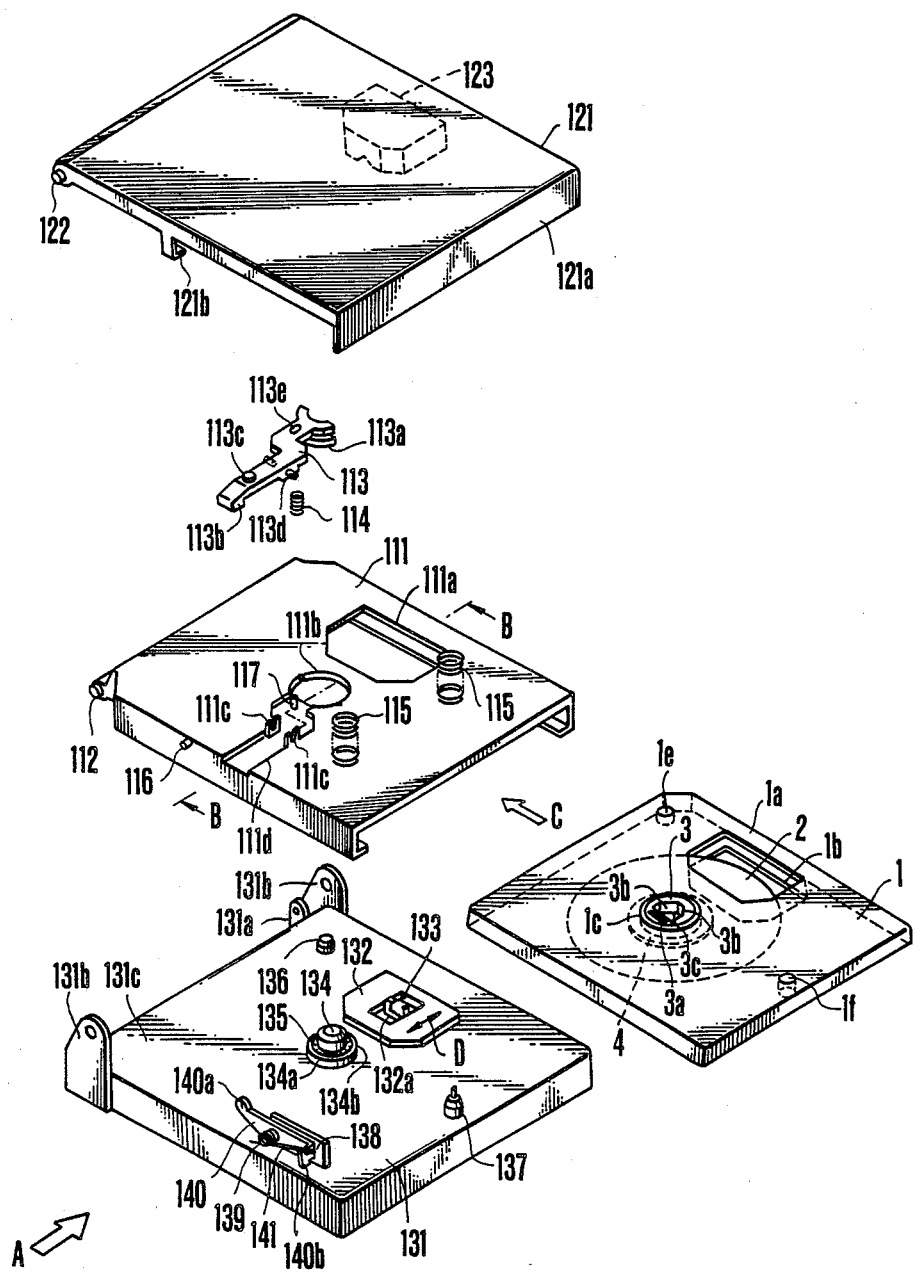
FIG. 5 is an exploded oblique view showing a further embodiment of this invention and particularly the cassette mounting or loading part thereof which is an essential part relative to this invention.

A third embodiment of this invention is arranged as shown in FIG. 5. In FIG. 5, the same reference numerals as those used in FIGS. 1 to 4 indicate the same component parts as those of the preceding embodiments.

Figure 7A:
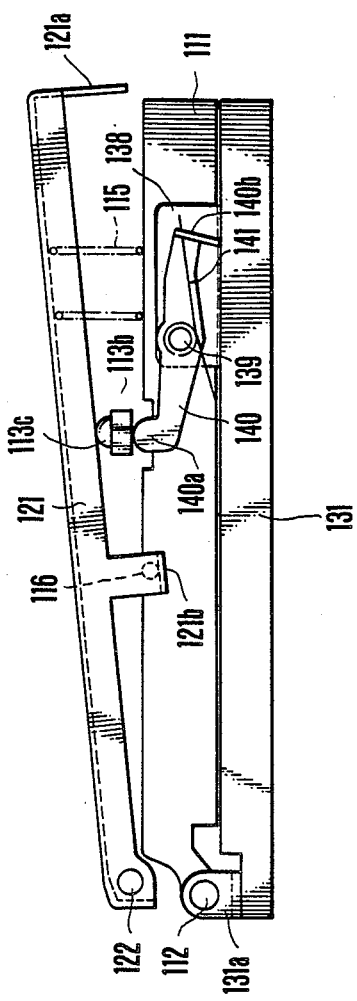
FIGS. 7(A) and 7(B) are a side view showing the movement of related parts during the process of the closing action of the external cover as viewed in the direction of arrow A of FIG. 5 and a side view taken along line B—B of FIG. 5.
Figure 7B:
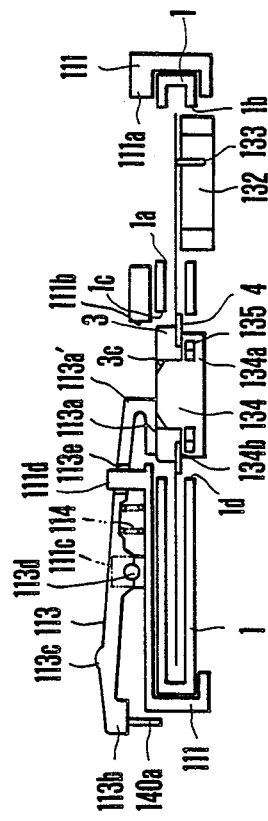
Figure 8A:
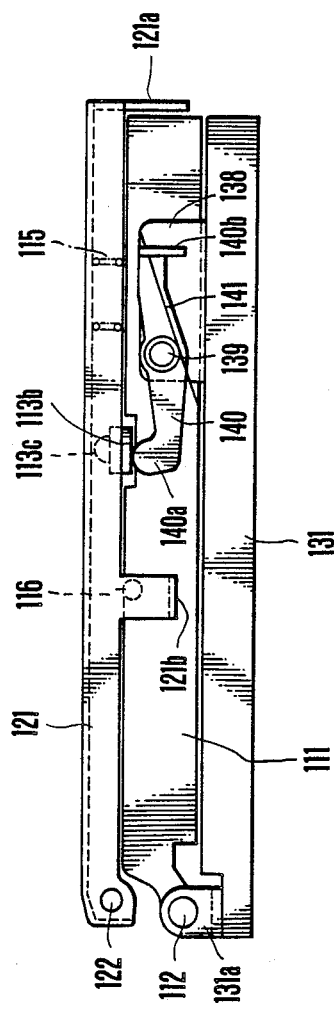
FIGS. 8(A) and 8(B) are a side view taken in the direction of arrow A and a sectional view taken along line B—B of FIG. 5 respectively showing the movement of related parts under a condition obtained after completion of the closing action of the external cover.
Figure 8B:
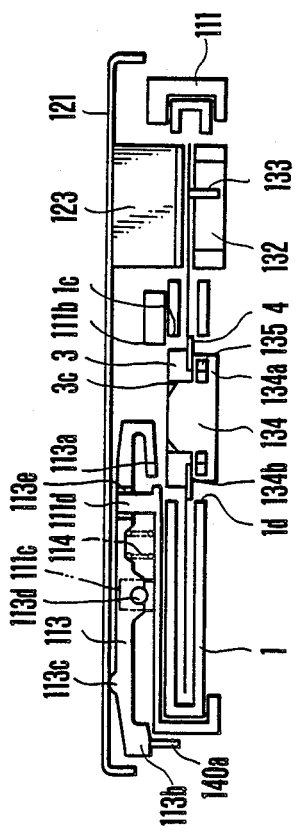

The illustration includes upper and lower aperture parts 1c and 1d which correspond to the center core 3 as shown also in FIGS. 6(B), 7(B) and 8(B); and positioning holes 1e and 1f which are provided for positioning the cassette 1.

A cassette holder 111 is pivotally carried by shafts 112 disposed on two sides thereof (the drawing shows only the shaft 112 on the left side) and is arranged to be turnable at a hinge part 131a which is disposed on the side of the body 131 of the apparatus. The holder 111 is provided with apertures 111a and 111b which correspond to the apertures 1a and 1c provided in the upper side of the cassette 1 respectively. A recessed part 111d is formed on the upper surface of the holder 111. The recessed part 111d is provided with a pair of uprising parts 111c which are arranged to receive the turning shaft 113d of a center core pressing member 113 which is arranged to serve as mounting means. The pressing member 113 is urged by the force of a spring 114 to turn counterclockwise on the shaft 113d. The pressing member 113 is provided with a semi-circular pressing part 113a for pressing the center core 3 of the magnetic sheet 2. The pressing part 113a is located above the aperture 111b of the holder 111. The tail end 113b of the pressing member 113 protrudes from the left side of the holder 111. A pair of coiled springs 115 are arranged on the upper surface of the holder 111 to push an external cover 121 from below in such a way as to exert a turning force in between the holder 111 and the external cover 121 to urge them to move in opposite directions, i.e. in the direction of widening a space left between them. The aperture 111a of the holder 111 serves to enable an upper stabilizer plate 123 to come therethrough to stabilize the rotation of the magnetic sheet 2 for a head 133. A pin 116 is provided on the side face of the holder 111. Another pin 117 is arranged to guide the up and down turning movement of the pressing member 113 and is disposed at the recessed part 111d on the upper surface of the holder 111. The pin 117 is thus arranged to come into a hole 113e provided in the pressing member 113.

The external cover 121 is arranged to close up the holder 111. The cover 121 is pivotally carried by a pair of shafts 122 disposed on left and right sides of the cover (the drawing shows only the left shaft 122) at a hinge part 131b arranged on the apparatus body 131 in a manner similar to the holder 111. A lock device which is not shown is arranged in between one end part 121a of the external cover 121 and the apparatus body which is also not shown. A hook part 121b is provided on one side of the external cover 121. The hook part 121b is arranged to engage a pin 116 provided on one side of the holder 111 and thus to keep at a predetermined degree the angle being urged to widen between the external cover 121 and the holder 111 by the urging force of the above-stated spring 115. An upper stabilizer plate 123 is provided on the ceiling part of the external cover 121 in a position corresponding to the aperture 111a of the holder 111 and is thus arranged to stabilize the rotation of the magnetic sheet 2 for a magnetic head 133 which will be described later.

A reference numeral 131 denotes the body of the apparatus. The body 131 is provided with a pair of hinge parts 131a which are arranged to carry the left and right shafts 112 of the cassette holder (the drawing shows only the right-hand side hinge part) and also a pair of hinge parts 131b which are arranged to carry the left and right shafts 122 of the external cover 121. A lower stabilizer plate 132 is provided on a stage surface 131c of the body 131 in a position corresponding to the aperture 1b of the cassette 1 and is arranged to stabilize the rotation of the magnetic sheet 2 in cooperation with the upper stabilizer plate 123. A recording or reproducing magnetic head 133 is arranged to come into the cassette 2 through an aperture 132a provided in the lower stabilizer plate 132 and the aperture 1b of the cassette and thus to abut on the magnetic sheet 1. Further, the magnetic head 133 is arranged to have its recording or reproducing position on the magnetic sheet shiftable by means of a known device which is not shown but is arranged to shift the head in the direction of arrow D. A rotary driving shaft or spindle 134 which drives the magnetic sheet 2 to rotate is arranged to be rotated by a sheet rotating motor which is not shown. The spindle 134 is provided with a flange part 134a. The height of the magnetic sheet 2 relative to the head 133 is defined with the magnetizable plate 4 which is provided on the lower surface of the center core 3 arranged to come to abut on the end face 134b of the flange part 134a. A permanent magnet 135 is disposed at the flange part 134a of the spindle 134 to attract the magnetizable plate 4 provided on the lower surface of the center core 3. Pins 136 and 137 which are provided for positioning the cassette 1 are arranged on the stage surface 131c of the body 131 in positions corresponding to the positioning holes 1e and 1f of the cassette 1. A base plate 138 is secured to the stage surface 131 in a position corresponding to the left side of the holder 111. A shaft 139 is secured to the base plate 138 and is arranged to rotatably carry a lever 140. The lever 140 serves as an actuating member for causing the pressing member 113 to act on the center core 3 of the magnetic sheet 2 by turning clockwise against the force of a spring 114. A spring 141 has its two ends respectively engaged with the stage surface 131c and the tail end 140b of the lever 140 and urges the lever 140 to turn clockwise on the shaft 139. The clockwise movement of the lever 140 is restricted to an extent at which the tail end 140b thereof comes to impinge on the stage surface 131c. The fore end 140a of the lever 140 is arranged to come to engage the tail end 113b of the pressing member 113. The urging force of the spring 141 exerted on the lever 140 is stronger than that of the spring 114 exerted on the pressing member 113.

Although they are omitted from the illustration, there are provided a spring and a stopper between the external cover 121 and the body 131. The spring is arranged to urge the external cover 121 to turn away from the body 131 to widen an opening angle relative to the body 131. The stopper is arranged to restrict the opening angle to a predetermined degree.

Referring now to FIGS. 6(A), 6(B), 7(A), 7(B), 8(A) and 8(B), the apparatus which is arranged as described above operates as described below:

FIG. 6(A) shows the external cover 121 and the holder 111 as in an open state for inserting or taking out the cassette 1. Under this condition, the center core pressing member 113 has been turned counterclockwise by the spring 114 to have the tail end 113b thereof abutting on the upper surface of the cassette holder 111 as shown in FIG. 6(B). Therefore, the pressing part 113a is retracted away from the aperture 111b of the holder 111 and does not hinder the cassette 1 from being inserted or taken out.

Let us assume that the cassette 1 is inserted into the holder 111 in the direction of arrow C of FIG. 6(A) and the external cover 121 is turned round clockwise against the force of a spring which is not shown. In this instance, the urging force of the spring 115 provided on the holder 111, the pin 116 and the hook part 121b of the external cover 121 jointly serve to keep a space (or angle) between the holder 111 and the cover 121 unvarying during the clockwise movement. Then, before the holder 111 reaches a predetermined position for setting the cassette 1 in a recording or reproducing position relative to the apparatus body 131 through the process as shown in FIG. 7(A), the spindle 134 comes into the mounting hole 3c provided in the center core 3 of the magnetic sheet 2. Further, as shown in FIG. 7(B), the tail end 113b of the pressing member 113 impinges on the fore end 140a of the lever 140. Then, since the force of the spring 141 acting on the lever 140 is stronger than the force of the spring 114 acting on the pressing member 113, the pressing member 113 is caused to turn clockwise against the force of the spring 114. The pressing part 113a of the pressing member then comes into the aperture 111b of the holder 111. The pressing part 113a pushes the center core 3 of the magnetic sheet 2 until the latter comes to a point where the magnetizable plate 4 which is provided on the lower surface of the center core comes to abut on the end face 134b of the flange part 134a of the spindle 134. In this instance, any excess of the action of the lever 140 on the pressing member 113 can be absorbed, for example, by a holded back portion 113a obtained by forming the pressing part 113a in a resilient U sectional shape which gives a required degree of resilience. For this purpose, the pressing member 113 is preferably made of, for example, a synthetic resin. In an alternative method for attaining the same effect, the spring force of the spring 141 is so adjusted that, when a resisting force against the pressing member 113 resulting from the impingement of the magnetizable plate 4 of the lower surface of the center core 3 on the end face 134b of the flange part 134a of the spindle 134 comes to exceed a predetermined value, the lever 140 is caused to turn counterclockwise against the force of the spring 141 as shown in FIG. 7(A).

At this point of time, the magnetic sheet 2 is thus accurately and reliably mounted on the spindle 134 at its center core 3. Under this mounting completed condition, the magnetizable plate 4 which is provided on the lower surface of the center core 3 is attracted by the permanent magnet 135 which is provided at the flange part 134a of the spindle 134. Further, the spring part 3a which is provided at the mounting hole 3c of the center core as shown in FIG. 5 brings about a lateral pressure between the outer circumferential surface of the spindle 134 and the spring part 3a and the two slanting face parts 3b (see FIG. 5). The magnetic sheet 2 is thus secured to the spindle 134 by virtue of the lateral pressure. Further, under this condition, the positioning pins 136 and 137 which are provided on the stage surface 131c of the body 131 respectively enter the positioning holes 1e and 1f of the cassette 1 to determine the position and the height of the cassette 1. Meanwhile, as shown in FIG. 7(B), the lower stabilizer plate 132 and the magnetic head 133 enter the inside of the cassette 1 via the lower aperture 1b thereof to confront and abut on the recording surface of the magnetic sheet 1 respectively.

When the external cover 121 turns further, it reaches a predetermined point where the holder 111 is closed up by the cover as shown in FIG. 8(A). With the cover coming to this position, the cover 121 is locked in place on the apparatus body 131 by a lock device which is not shown. Then, under this condition at least, the ceiling part of the external cover 121 pushes a protrudent part 113c which is provided on the tail end 113b. Therefore, as shown in FIG. 8(B), this causes the pressing member 113 to turn counterclockwise. The center core 3 is then released from the pressure of the pressing part 113a. Thus, with the external cover 121 locked in this position, the pressing member 113 is kept in a non-pressing state. In this case, as shown in FIG. 8(A), the lever 140 is turned counterclockwise against the force of the spring 141. Further, under this condition, as shown in FIG. 8(B), the upper stabilizer plate 123 which is provided at the ceiling part of the external cover 121 enters the inside of the cassette 1 via the aperture 111a of the holder 111 and the aperture 1a of the cassette 1 to come to closely confront the upper surface of the magnetic sheet 2. Therefore, when the magnetic sheet 2 is rotated by the spindle 134, the sheet 2 is stabilized relative to the magnetic head 133 to ensure adequate contact with the head 133.

In taking out the cassette 1 under the condition of FIGS. 8(A) and 8(B), the embodiment comes back to the condition of FIGS. 6(A) and 6(B) through the condition of FIGS. 7(A) and 7(B). The details of this operation require no further description.

In a modification example of the specific embodiment described above, the lever 140 which is arranged on the apparatus body 131 to act on the pressing member 113 and the associated members 138, 139 and 141 can be replaced with a single coiled spring or the like. The number of required parts can be lessened by this modification.

In another modification example, the members 138 to 141 which are arranged on the side of the apparatus body 131 are replaced with some urging member such as a coiled spring or a leaf spring which is arranged on the ceiling part of the external cover 121 in a position corresponding to the fore end part of the pressing member 113 to exert a larger spring force than that of the spring 114 which is acting on the pressing member 113. The modification is arranged such that, during the process of closing movement of the external cover 121 for closing up the holder 111, this urging member comes to act on the fore end portion of the pressing member 113. This causes the pressing member 113 to turn clockwise against the force of the spring 114 as shown in FIG.

7(B) and thus to come to push the center core 3. After that, the ceiling part of the external cover 121 comes to push the protrudent part 113c disposed on the tail end 113 of the pressing member 113 at least upon completion of the turning movement of the external cover 121, that is, when the cover 121 comes to take the position as shown in FIGS. 8(A) and 8(B). Then, this causes the pressing member 113 to turn round counterclockwise against the force of the urging member, so that the center core 3 can be released from the pressure of the pressing member. This arrangement likewise permits reduction in the number of parts.

In the embodiments given in the foregoing, this invention is applied to a recording or reproducing apparatus of the kind using a flexible magnetic sheet contained in a cassette. However, this invention is not limited to such embodiments but is likewise advantageously applicable to other apparatuses of different kinds using, for example, hard discs (magnetic or optical discs), etc.

The advantages of this invention, as described in the foregoing, are as follows: The adequate positioning precision in pressing the mount part of the recording medium ensures accurate and reliable mounting on the rotary driving shaft. Simple and compact structural arrangement for mounting and for cancelling the mounting state permits reduction in size and cost of the apparatus. Therefore, the invention is highly advantageous for a recording or reproducing apparatus of the kind using a rotary recording medium.

What is claimed is:

1. An apparatus for recording information on or reproducing information from a recording medium, the recording medium having a mounting part for mounting the medium to the apparatus, the apparatus comprising:
   holder means for receiving and housing the recording medium and being movable to position said medium in a predetermined recording or reproducing position;
   cover means which is movable to a given position adjacent said holder means, said cover means being arranged outside said holder means;
   rotating means for rotating said recording medium positioned in said predetermined recording or reproducing position by said holder means;
   pressing means arranged at said holder means for mounting said recording medium onto said rotating means by pressing the mounting part of said recording medium, said pressing means being arranged to operate to press said recording medium to said rotating means, depending upon a movement of said holder means in one direction from its opening position to its closing position;
   release means which is arranged to cancel the press fit mounting state of said pressing means when said cover means moves to said predetermined position to cover said holder means; and
   means for recording information or reproducing information from the recording medium as said recording medium is driven by said rotating means.

2. An apparatus according to claim 1, wherein said rotating means is arranged to be pivotably mounted to said apparatus.

3. An apparatus according to claim 1, wherein said cover means is arranged to be at said predetermined position so as to cover said holder means when said holder means positions said recording medium in said recording or reproducing position within the recording or reproducing apparatus.

4. An apparatus according to claim 1, wherein each of said rotating means and said mounting part of said recording medium includes magnetically attracting means for mutual attraction.

5. An apparatus according to claim 1, wherein said mounting means has a first state in which said mounting means is not press fitting said mounting part of said recording medium onto said rotating means and a second state corresponding to said press fit mounting state in which said mounting means is press fitting said recording medium onto said rotating means.

6. An apparatus according to claim 5, wherein said mounting means is responsive to the movement of said cover means to said given position and changes from said first state to said second state and then back to said first state as said external cover means moves to and reaches said predetermined position.

7. An apparatus in accordance with claim 1 wherein:
   said holder means has an opening for receiving said recording medium; and
   said cover means when in said predetermined position closes said opening.

8. An apparatus for recording information on or reproducing information from a recording medium, the recording medium having mounting part for mounting the medium to the apparatus, the apparatus comprising:
   holder means for receiving and housing the recording medium and being movable to position said medium is a predetermined recording or reproducing position;
   rotating means for driving said recording medium after said medium is positioned in said recording or reproducing position by said holder means;
   pressing means arranged at said holder means for mounting said recording medium onto said rotating means by pressing the mounting part of said recording medium, said pressing means being arranged to operate to press said recording medium to said rotating means, depending upon a movement of said holder means in one direction from its opening position to its closing position;
   cover means which is movable to a predetermined position adjacent said holder means, at least at said predetermined position, on said pressing means to cancel the press fit mounting state or said mounting means; and
   means for recording information on or reproducing information rom the recording medium as said recording medium is driven by said rotating means.

9. An apparatus according to claim 8, wherein said receiving and housing means is arranged to be pivotably mounted to said apparatus.

10. An apparatus according to claim 8, wherein each of said rotating means and said mounting part of said recording medium includes magnetically attracting means for mutual attraction.

11. An apparatus according to claim 8, wherein said pressing means has a first state in which said pressing means is not press fitting said mounting part of said recording medium onto said rotating means and a second state corresponding to said press fit mounting state in which said mounting means press fits said recording medium onto said rotating means.

12. An apparatus according to claim 11, wherein said mounting means is responsive to the movement of said cover means to said predetermined position and changes from said first state to said second state and then back to said first state as said cover means moves to and reaches said given position.

13. A loading device for use with a recording medium comprising:
(a) carrying means for carrying said recording medium, said means being arranged to shift said recording medium between a first position in which recording or reproduction on said medium cannot be performed and a second position in which recording or reproduction on said medium can be performed;
(b) covering means movable from its opened position to closed position to cover said medium shifted at said second position by said carrying means;
(c) urging means arranged to be in a first state in which said urging means does not act on said recording medium and a second state in which said urging means urges said recording medium; and
(d) control means for controlling said urging means, said control means being arranged to bring said urging means into said first state when said recording medium is in said first position, to bring said urging means into said second state for urging said medium in one given direction when said medium is in said second position and, after that, to bring said urging means back to said first state in which said urging means does not act on said recording medium in response to the movement of said covering means from said opened position to said closed position.

14. A device according to claim 12, further comprising a head which is arranged to perform signal recording or reproducing operation on or from said recording medium when said medium is in said second position.

15. A device according to claim 13, wherein said control means is arranged to shift the state of said urging means from said first state to said second state and back to said first state as said carrying means shifts the position of said recording medium from said first position toward said second position.

16. A device according to claim 15, further comprising recording medium driving means arranged to be coupled with said recording medium when said medium is in said second position thereof.

17. A device according to claim 16, further comprising magnetic means for causing said recording medium and said recording medium driving means to attract each other when they are coupled.

18. An apparatus for recording information on or reproducing information from a recording disc, the recording disc having a mounting part for mounting the disc to the apparatus, the apparatus comprising:
(A) a holder member arranged to be movable to a first position able to receive said recording disc and a second position within said apparatus able to record or reproduce said recording disc;
(B) a cover member arranged to open or close together with said holder member and to cover, under its closed state, said holder member moved to said second position;
(C) a spindle arranged to engage with and rotate the mounting part of said recording disc housed in said holder member brought to said second position;
(D) a pressing member, arranged on part of said holder opposite to said cover member, for pressing the mounting part of said recording disc toward said spindle so as to mount the mounting the part of said recording disc housed in said holder member onto said spindle by the movement of said holder member from said first position to said second position in one direction; and
(E) press-release means, arranged on part of said cover member, for parting said pressing member from said mounting part of said recording disc to release the pressing of said pressing member on said mounting part when said cover member moves to said closed state in one direction and closes to cover said holder member brought to said second position.

19. An apparatus for recording or reproducing a signal on a disc-like recording medium having a center core at its central portion, comprising:
(A) a holder rotatably supported on said apparatus and movable to an open position to enable release of said recording medium and to a closed position for bringing said recording medium inserted in said apparatus at the open position to a recording or reproducing position within said apparatus;
(B) a cover located outside said holder and rotatably supported on said apparatus so as to open and close together with said holder;
(C) a spindle which engages with the center core of said recording medium to rotate the recording medium brought to said recording or reproducing position within said apparatus by said holder;
(D) a pressing member, attached on said holder, for pressing the center core of said recording medium housed in said holder to mount the center core onto said spindle, said pressing member being exerted by a spring to press the center core onto said spindle when said holder moves from said first position to said second closed position in a direction;
(E) a release member provided on said cover and engageable with said pressing means when the cover is rotated to close the apparatus to move against the spring in a direction to part the pressing member from said center core to release the pressing force on said center core; and
(F) a head for recording or reproducing on said recording medium being rotated by said spindle.

* * * * *